United States Patent
Yonemoto

[11] Patent Number: 5,933,209
[45] Date of Patent: Aug. 3, 1999

[54] LIQUID CRYSTAL DISPLAY DEVICE

[75] Inventor: Kenichi Yonemoto, Kagoshima, Japan

[73] Assignee: Sony Corporation, Tokyo, Japan

[21] Appl. No.: 08/798,545

[22] Filed: Feb. 11, 1997

[30] Foreign Application Priority Data

Feb. 15, 1996 [JP] Japan .................................. 8-050765

[51] Int. Cl.⁶ .............................................. G02F 1/1339
[52] U.S. Cl. ...................................... 349/153; 349/154
[58] Field of Search ................................. 349/153, 154

[56] References Cited

U.S. PATENT DOCUMENTS

| | | | |
|---|---|---|---|
| 4,037,930 | 7/1977 | Matsuyama et al. | 349/154 |
| 4,095,876 | 6/1978 | Horsting et al. | 349/154 |
| 4,106,860 | 8/1978 | Kaufmann | 349/152 |
| 4,277,143 | 7/1981 | Pauli et al. | 349/152 |

FOREIGN PATENT DOCUMENTS

| | | | |
|---|---|---|---|
| 55-67727 | 5/1980 | Japan | 349/154 |
| 60-67928 | 4/1985 | Japan | 349/153 |
| 63-313125 | 12/1988 | Japan | 349/153 |

*Primary Examiner*—Hung X. Dang
*Assistant Examiner*—Tai V. Duong
*Attorney, Agent, or Firm*—Hill & Simpson

[57] ABSTRACT

The present invention provides a liquid crystal display device which is capable of improving moisture resistance of a liquid crystal injection port by preventing peeling of a sealant therein. The liquid crystal display device has a pattern for preventing peeling of a sealant which is provided, through an insulating film, in a contact portion between a TFT substrate and the sealant in the liquid crystal injection port by arranging ITO having higher adhesion to the sealant than that to a glass substrate as the TFT substrate in a predetermined pattern. This causes the ITO of the pattern for preventing peeling of the sealant to improve the adhesion between the sealant and the TFT substrate in the liquid crystal injection port. Even if cracks occur in the ITO or the sealant in the pattern for preventing peeling of the sealant due to the thermal stress generated in ultraviolet irradiation of the sealant with which the liquid crystal injection port is filled, propagation of the cracks is prevented in the interfaces between ITO portions and portions without ITO.

14 Claims, 3 Drawing Sheets

LIQUID CRYSTAL DISPLAY DEVICE

BACKGROUND OF THE INVENTION

1. Field of the Invention

The present invention relates to a liquid crystal display device comprising a liquid crystal injection port sealed with a sealant.

2. Description of the Related Art

For example, a TFT (Thin Film Transistor) active matrix driving type of liquid crystal display device comprises two opposed substrates including a substrate (referred to as a "TFT substrate" hereinafter) on which TFTs are formed, and a substrate (referred to as a "counter substrate" hereinafter) on which a whole-surface counter electrode is formed, and a liquid crystal sealed between the two substrates. Each of the pixel electrode on the TFT substrate and the whole-surface counter electrode on the counter substrate is a transparent electrode comprising, for example, indium oxide mixed with tin oxide (Indium Tin Oxide; referred to as "ITO" hereinafter). The process for manufacturing such a liquid crystal display device, for example, comprises printing a sealant to laminate the two substrates with leaving a liquid crystal injection port in the periphery of one of the two substrates, injecting a liquid crystal between the two substrates through the liquid crystal injection port, and sealing the substrates with a sealant, for example, comprising an ultraviolet curable resin.

The conventional process for manufacturing a liquid crystal display device causes peeling between a sealant and the surface of a substrate due to thermal stress in ultraviolet irradiation of the sealant with which the liquid crystal injection port is filled and which comprises an ultraviolet curable resin, for curing the sealant, thereby causing the problem of deteriorating moisture resistance of the sealing portion (liquid crystal injection port) of the liquid crystal display device. As a measure against this problem, ITO for a transparent electrode is disposed over the whole surface of a part of the surface of a substrate which contacts the sealant. However, in this case, although there is no problem with the adhesion between the sealant and the ITO on the surface of the substrate, ITO is cracked due to thermal stress in ultraviolet irradiation for curing the sealant, thereby causing the problem of deteriorating moisture resistance of the sealing portion of the liquid crystal display device.

SUMMARY OF THE INVENTION

The present invention has been achieved in consideration of the above problems, and an object of the present invention is to provide a liquid crystal display device which is capable of preventing peeling of a sealant in a liquid crystal injection port and thus improving moisture resistance thereof.

In order to achieve the object, in accordance with an aspect of the present invention, there is provided a liquid crystal display device comprising a pair of substrates each having an electrode formed on the inner surface thereof and disposed opposite to each other with a predetermined space therebetween; a sealing portion for sealing the periphery between the substrates; a liquid crystal sealed between the substrates; a liquid crystal injection port formed in a portion of the periphery, for injecting the liquid crystal between the substrates; a sealant for sealing the liquid crystal injection port; and means for preventing peeling of the sealant formed in a contact portion between at least one of the substrates and the sealant, the means for preventing peeling of the sealant having a predetermined pattern formed by using a material having higher adhesion to the sealant than that to the substrate.

Preferably, the pattern includes a plurality of linear parts which are arranged so that the linear parts extend in the direction perpendicular to the direction of injection of the liquid crystal and adjacent linear parts are at different positions in the direction perpendicular to the direction of injection of the liquid crystal.

In the liquid crystal display device of the present invention, since the predetermined pattern comprising a material having higher adhesion to the sealant than that to the substrate is formed in the contact portion between at least one of the two substrates and the sealant, the adhesion between the substrate and the sealant is improved, and the propagation of cracks is prevented.

In the liquid crystal display device of the present invention, since the pattern includes a plurality of linear parts arranged so that the linear parts extend in the direction perpendicular to the direction of injection of the liquid crystal and that adjacent linear parts in the direction of injection of the liquid crystal are at different positions in the direction perpendicular to the direction of injection of the liquid crystal, it is possible to effectively prevent cracks from easily reaching the periphery of the liquid crystal display device.

DESCRIPTION OF THE PREFERRED EMBODIMENT

Figure 1:
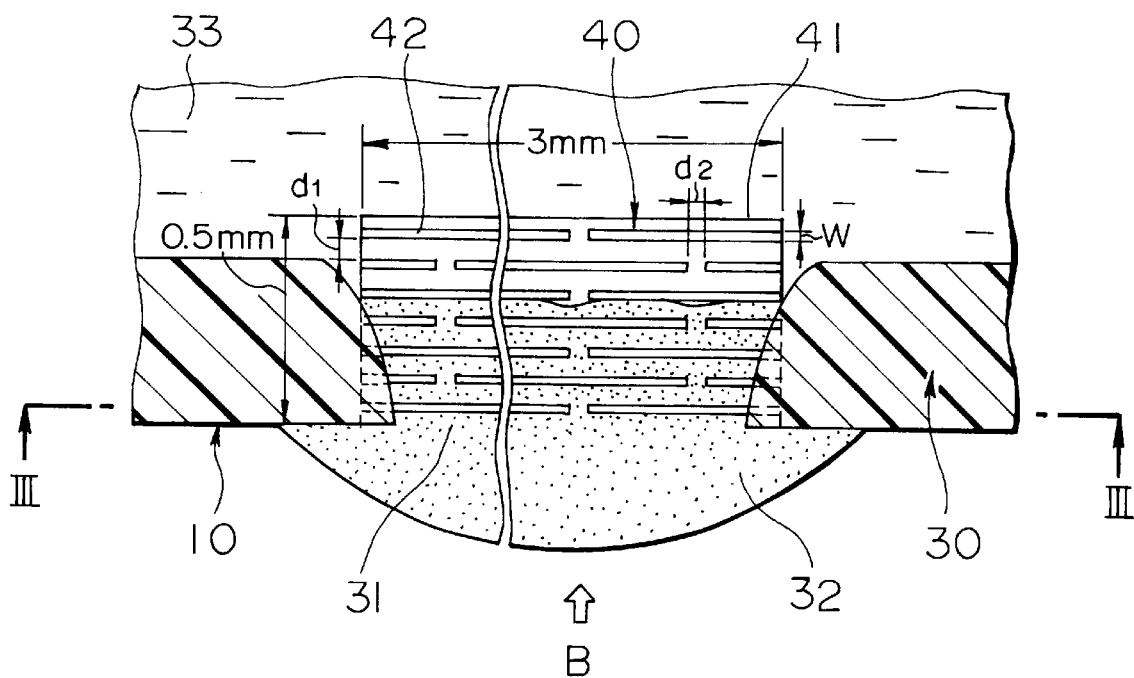
FIG. 1 is a sectional view showing the vicinity of a liquid crystal injection port in a liquid crystal display device in accordance with an embodiment of the present invention.
Figure 2:
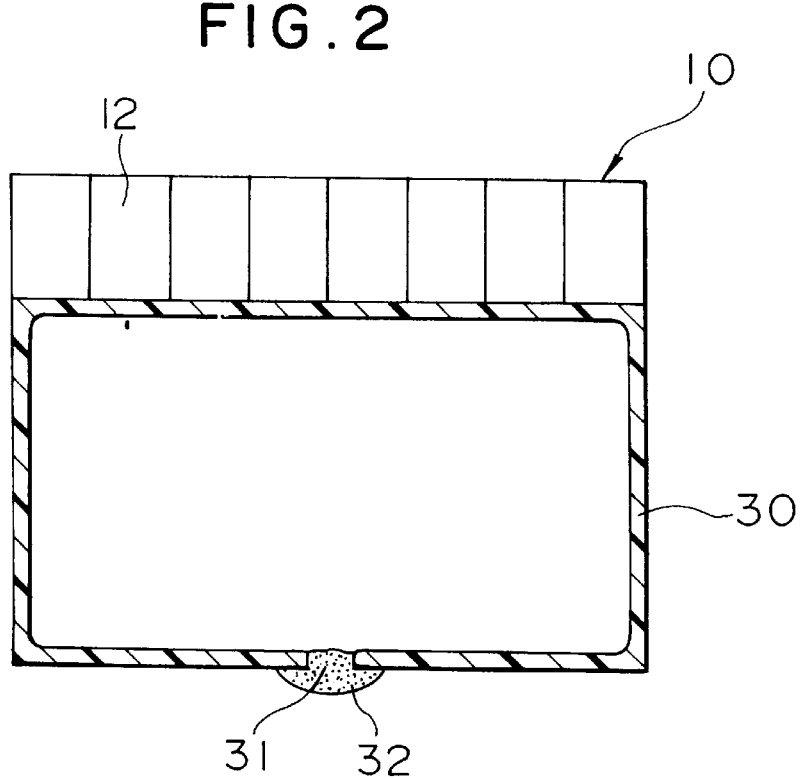
FIG. 2 is a plan view of the cut area of a sealing portion, illustrating the TFT substrate side of a liquid crystal display device in accordance with an embodiment of the present invention.

An embodiment of the present invention will be described in detail below with reference to the drawings. FIG. 1 is a sectional view illustrating the vicinity of a liquid crystal injection port of a liquid crystal display device in accordance with an embodiment of the present invention. FIG. 2 is a plan view of the cut area of a sealing portion, illustrating the TFT substrate side of the liquid crystal display device in accordance with this embodiment, and FIG. 3 is a sectional view taken along line III—III in FIG. 1.

The liquid crystal display device in accordance with this embodiment is a TFT active matrix driving type of liquid crystal display device. As shown in FIG. 3, the liquid crystal display device comprises two substrates disposed opposite to each other with a predetermined space therebetween, i.e., a TFT substrate 10 having a TFT formed thereon and a counter substrate 20 having a whole-surface counter electrode formed thereon, a sealing portion 30 for sealing the periphery between the two substrates 10 and 20, a liquid crystal injection port 31 which is formed in a portion of the periphery between the two substrates 10 and 20, for injecting a liquid crystal between the two substrates 10 and 20, and which is sealed with a sealant 32 after injection of a liquid crystal, and a liquid crystal 30 injected through the liquid crystal injection port 31 and sealed between the two substrates 10 and 20.

The TFT substrate 10 comprises, for example, a glass substrate 11, having TFT serving as a pixel electrode and a switch element, scanning lines and signal lines, which are not shown in the drawings, and which are formed on the liquid crystal-side of the glass substrate 11. On one side of the TFT substrate 10 are provided signal input pads (electrodes) 12. The counter substrate 20 comprises, for example, a glass substrate 21, having a whole-surface counter electrode formed over the whole surface of the liquid crystal-side of the glass substrate 21. In a liquid crystal display for color display, for example, filters of R (red), G (green) and B (blue) colors, etc. are provided between the glass substrate 21 and the whole-surface counter electrode in correspondence with the respective pixels. Each of the pixel electrode on the TFT substrate 10 and the whole-surface counter electrode on the counter substrate 20 is a transparent electrode comprising, for example, ITO. The sealing portion 30 consists of a sealing material such as an epoxy adhesive or the like. As the sealant 32, for example, an ultraviolet curable resin is used.

Figure 3:
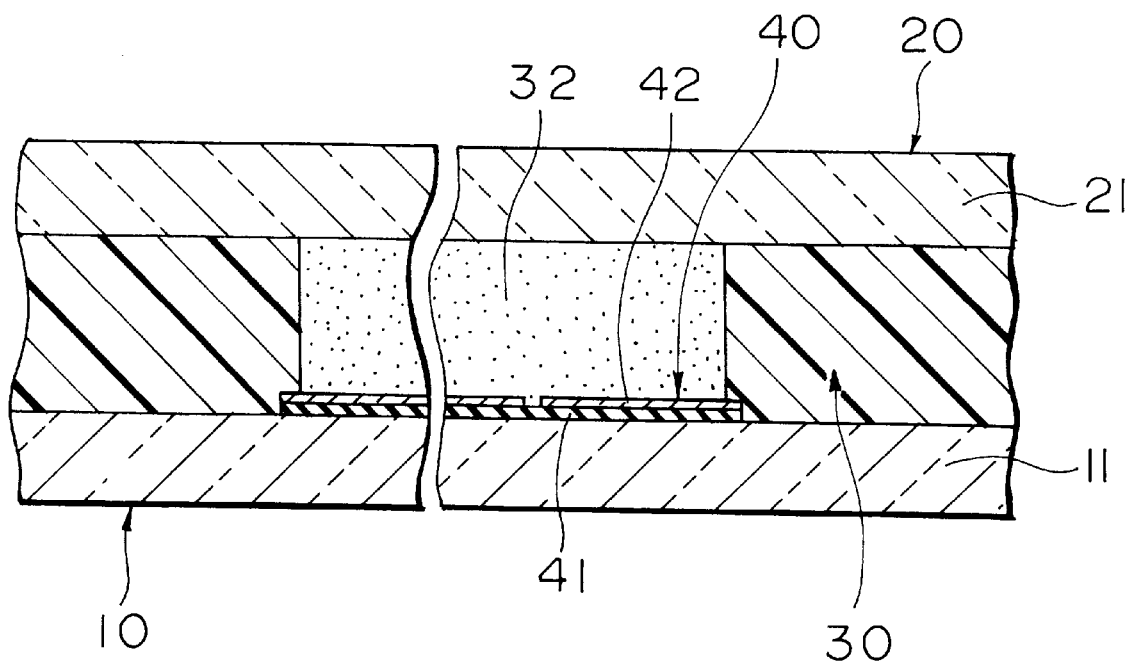
FIG. 3 is a sectional view taken along line III—III in FIG. 1.

As shown in FIGS. 1 and 3, the liquid crystal display device of this embodiment further comprises as means for preventing peeling of the sealant a pattern 40 for preventing peeling of the sealant which is formed in a contact portion between the TFT substrate 10 and the sealant by arranging in a predetermined pattern a material having higher adhesion to the sealant 32 than that to the glass substrate 11 through an insulating film 41. As the material having higher adhesion to the sealant 32 than that to the glass substrate 11, the same ITO as the pixel electrode is used. The pattern 40 for preventing peeling of the sealant is formed by arranging ITO on the insulating film 41 formed on the glass substrate 11 in a pattern comprising a plurality of linear parts 42 so that each of the linear parts extends in the direction perpendicular to the direction B of injection of the liquid crystal and adjacent linear parts in the direction B of injection of the liquid crystal are at different positions in the direction perpendicular to the direction B of injection of the liquid crystal. The pattern 40 for preventing peeling of the sealant can be formed at the same time the formation of the pixel electrodes by ITO in the process of manufacturing the TFT substrate 10.

As shown in FIG. 1, the region of the pattern 40 for preventing peeling of the sealant, e.g., the region of the insulating film 41, for example, is a rectangular region having an inward length of 0.5 mm from the outer end of the liquid crystal injection port 31 in the direction B of injection of the liquid crystal and a length of 3 mm in the direction perpendicular to the direction B of injection of the liquid crystal. Each of the linear parts 42 microscopically has a rectangular form. The linear parts 42 are arranged in a plurality of lines so that a plurality of linear parts are formed in each of lines, and adjacent linear parts 42 in the direction B of injection of the liquid crystal have an alternate positional relation. The width w of each linear part 42 is, for example, 20 μm, the distance $d_1$ between the adjacent linear parts 42 in the direction B of injection of the liquid crystal is, for example, 50 μm, and the distance $d_2$ between the respective linear parts 42 in one line is, for example, 8 μm.

The operation of the liquid crystal display device of this embodiment will be described below.

The process for manufacturing the liquid crystal display device of this embodiment, for example, comprises printing the sealing material serving as the sealing portion 30 to laminate the two substrates 10 and 20 with leaving the liquid crystal injection port 31 in the periphery of one of the two substrates 10 and 20, injecting the liquid crystal 33 into a space between the two substrates 10 and 20 through the liquid crystal injection port 31, and sealing the liquid crystal injection port 31 with the sealant 32 comprising, for example, an ultraviolet curable resin. When an ultraviolet curable resin is used as the sealant 32, after the liquid crystal injection port 31 is filled with the sealant 32, the sealant 32 is irradiated with ultraviolet rays to cure the sealant 32.

The liquid crystal display device of this embodiment comprises the pattern 40 for preventing peeling of the sealant which is formed in the predetermined pattern in the contact portion between the TFT substrate 10 and the sealant 32 by arranging ITO having higher adhesion to the sealant 32 than that to the glass substrate 11 in the predetermined pattern. Thus, in the liquid crystal injection port 31, the ITO in the pattern 40 for preventing peeling of the sealant improves the adhesion between the sealant 32 and the TFT substrate 10 and prevents peeling of the sealant 32. In the pattern 40 for preventing peeling of the sealant, ITO is formed in the predetermined pattern, not formed over the whole surface of the contact portion between the TFT substrate 10 and the sealant 32. As a result, the pattern 40 for preventing peeling of the sealant has ITO portions and portions without ITO. Therefore, even if the ITO or the sealant 32 in the pattern 40 for preventing peeling of the sealant is cracked due to the thermal stress generated in ultraviolet irradiation of the sealant 32 with which the liquid crystal injection port 31 is filled, propagation of cracks is prevented in the interfaces between the ITO portions and the portions without ITO, thereby preventing the cracks from reaching the periphery of the liquid crystal display device. Hence, the liquid crystal display device of this embodiment is capable of significantly improving the moisture resistance of the sealing portion (the liquid crystal injection port 31).

Figure 4A:
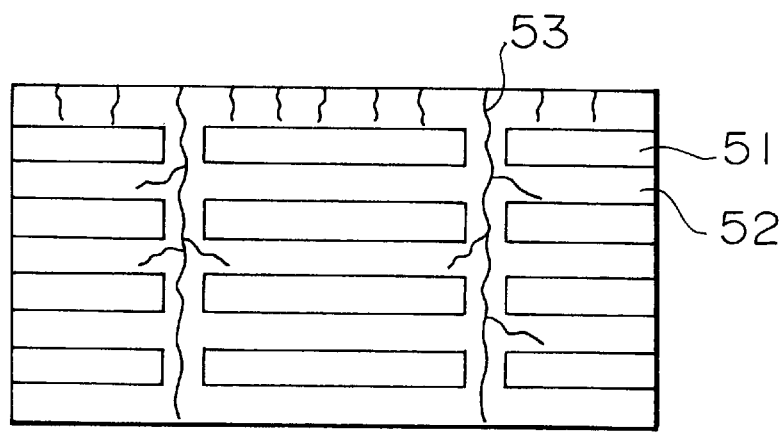
FIG. 4 is a drawing illustrating the effect of a pattern for preventing peeling of a sealant in a liquid crystal display device in accordance with an embodiment of the present invention.
Figure 4B:
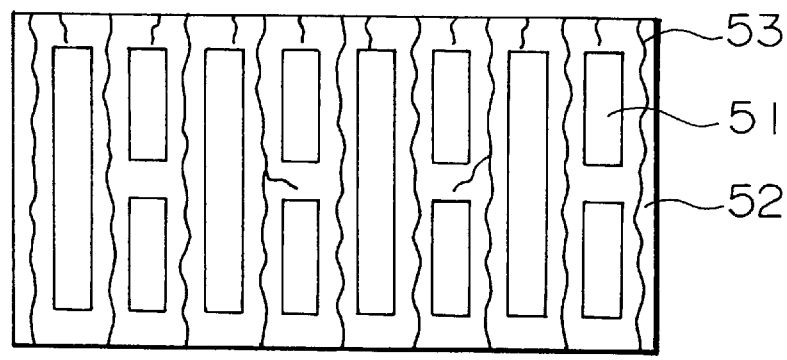
Figure 4C:
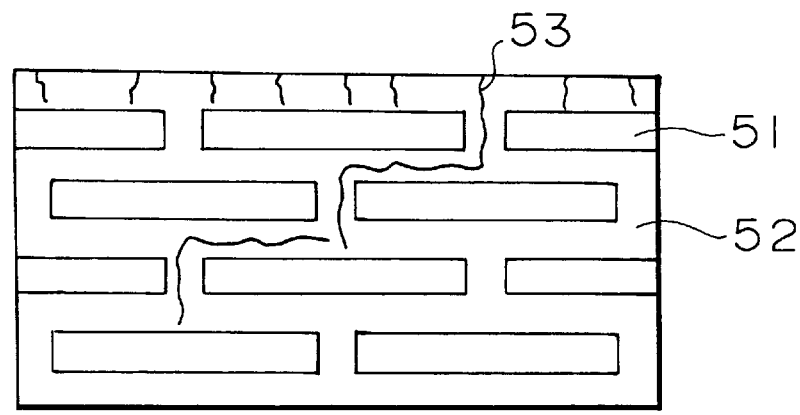

Particularly, in this embodiment, the pattern 40 for preventing peeling of the sealant is formed by arranging ITO in the pattern comprising a plurality of the linear parts 42 which are alternately arranged so that the linear parts 42 extend in the direction perpendicular to the direction B of injection of the liquid crystal, and adjacent linear parts 42 in the direction B of injection of the liquid crystal are at different positions in the direction perpendicular to the direction B of injection of the liquid crystal. Such an arrangement pattern of ITO can effectively prevent cracks from reaching the periphery of the liquid crystal display device. This will be described in detail below with reference to FIG. 4. In FIGS. 4A to C, reference numeral 51 denotes the ITO portions; reference numeral 52, the portions without ITO; and reference numeral 53, cracks which occur in the sealant 32. The periphery of the liquid crystal display device is shown on the lower side of the drawing, and thus the direction of injection of the liquid crystal is the vertical direction of the drawing. The case where ITO is arranged in the direction perpendicular to the direction of injection of the liquid crystal, as shown in FIG. 4A, is compared with the case where ITO is arranged in parallel with the direction of injection of the liquid crystal, as shown in FIG. 4B. In the former case, since ITO can more easily prevent propagation of the cracks 53, the probability that the cracks 53 reach the periphery of the liquid crystal display device is decreased. Then, the case where ITO is arranged so that adjacent linear parts in the direction of injection of liquid crystal are at the same position in the direction perpendicular to the direction of injection of liquid crystal, as shown in FIG. 4A, is compared with the case where ITO is arranged so that adjacent linear parts in the direction of injection of liquid crystal are at different positions in the direction perpendicular to the direction of injection of liquid crystal, as shown in FIG. 4C. In the latter case, since propagation of the cracks 53 is more easily prevented by ITO ahead in the direction of propagation, and the path of the cracks 53 to reach the periphery of the liquid crystal display device is lengthened, the probability that the cracks 53 reach the periphery of the liquid crystal display device is decreased. It is thus found that, when ITO is arranged, as shown in FIG. 4C, i.e., as in this embodiment, it is possible to effectively prevent cracks from reaching the periphery of the liquid crystal display device. This is true for the case where cracks occur in ITO in the pattern 40 for preventing peeling of the sealant.

The present invention is not limited to the above-mentioned embodiment. For example, the arrangement pattern of ITO in the pattern 40 for preventing peeling of the sealant is not limited to that shown in FIG. 1, and the pattern can appropriately be designed. In addition, materials other than ITO may be used for the transparent electrode. In this case, the pattern 40 for preventing peeling of the sealant may be formed by using the same material as the transparent electrode other than ITO. Alternatively, the pattern 40 for preventing peeling of the sealant may be formed by using a material having higher adhesion to the sealant than that to the substrate, which is different from the material of the transparent material. The pattern 40 for preventing peeling of the sealant may be formed in both substrates disposed opposite to each other. The present invention is not limited to a TFT active matrix driving type of liquid crystal display device, and can be applied other types of liquid crystal display devices such as a simple matrix driving type, etc.

As described above, since the liquid crystal display device of the present invention comprises the predetermined pattern formed by arranging a material having higher adhesion to the sealant than that to the substrate in the contact portion between at least one of the two substrates and the sealant, the present invention has the effects of improving the adhesion between the substrate and the sealant, preventing propagation of cracks, and improving moisture resistance of the liquid crystal injection port by preventing peeling of the sealant therein.

In addition to the above effects, since the means for preventing peeling of the sealant is formed by arranging a material having higher adhesion to the sealant than that to the substrate in a pattern comprising a plurality of linear parts which are arranged so that the linear parts extent in the direction perpendicular to the direction of injection of the liquid crystal, and adjacent linear parts in the direction of injection of the liquid crystal are different positions in the direction perpendicular to the direction of injection of the liquid crystal, the present invention has the effect of effectively preventing cracks from reaching the periphery of the liquid crystal display device.

What is claimed is:

1. A liquid crystal display device comprising:
   a pair of substrates each having an electrode formed on an inner side thereof and disposed opposite to each other with a predetermined space therebetween;
   a first sealant for sealing the periphery between the substrates;
   a liquid crystal sealed between the substrates;
   a liquid crystal injection port formed in a portion of the periphery, for injecting the liquid crystal between the substrates;
   a second sealant for sealing the liquid crystal injection port; and
   a pattern of distinct structures between the substrates comprising a material having higher adhesion to the second sealant than that to the substrate.

2. A liquid crystal display device according to claim 1, wherein the pattern comprises a plurality of linear structures which are arranged so that the linear structures extend in a direction perpendicular to a direction of injection of the liquid crystal, and adjacent linear structures in a direction perpendicular to the direction of injection of the liquid crystal are offset such that gaps between the structures are offset from one another.

3. A liquid crystal display device according to claim 1, wherein one of the electrodes is comprised of pixel electrodes formed in a matrix form on an insulating substrate.

4. A liquid crystal display device according to claim 3, wherein the pattern of distinct structures is comprised of a material which is the same as the material for the pixel electrodes.

5. A liquid crystal display device according to claim 4, wherein
   the material for the pixel electrodes is indium tin oxide.

6. A liquid crystal display device according to claim 1, wherein
   the second sealant comprises an ultraviolet curable resin.

7. A liquid crystal display device comprising:
   first and second substrates;
   a liquid crystal injection port in a periphery between the first and second substrates;
   a sealant for sealing the liquid crystal injection port; and
   a plurality of distinct structures formed between the first and second substrates at the injection port, said distinct structures comprising a material having higher adhesion to the sealant than to at least one of the substrates.

8. The liquid crystal display device of claim 7, wherein the plurality of distinct structures are substantially linear structures.

9. The liquid crystal display device of claim 8, wherein the plurality of distinct structures are formed on an insulating layer located on said substrate.

10. The liquid crystal display device of claim 8, wherein the plurality of distinct structures are located in at least two rows and wherein gaps between adjacent structures in one row are offset from gaps between adjacent structures in an adjacent row.

11. The liquid crystal display device of claim 10, wherein the plurality of distinct structures are formed on an insulating layer located on said substrate.

12. A liquid crystal display device according to claim 8, wherein
   the distinct structures are comprised of a same material as a material for pixel electrodes of the liquid crystal display.

13. A liquid crystal display device according to claim 12, wherein
   the material for the pixel electrodes is indium tin oxide.

14. A liquid crystal display device according to claim 10, wherein a sealant at the injection port comprises an ultraviolet curable resin.

* * * * *